235-379

5/8/84 OR 4,447,714

United States Patent [19]

Lundblad

[11] 4,447,714

[45] May 8, 1984

[54] DUAL-PURPOSE AUTOMATIC APPARATUS FOR DISPENSING AND DEPOSITING VALUABLE PAPERS AND OTHER DOCUMENTS, SUCH AS BANKNOTES, CHEQUES, RECEIPTS, VOUCHERS ETC.

[76] Inventor: Leif Lundblad, Häradsvägen 102, S-141 41 Huddinge, Sweden

[21] Appl. No.: 381,657

[22] Filed: May 25, 1982

[30] Foreign Application Priority Data

Jun. 29, 1981 [SE] Sweden ............................... 8104036

[51] Int. Cl.[3] ............................................ G06K 7/08

[52] U.S. Cl. .................................... 235/379; 235/381; 194/DIG. 26; 194/DIG. 9

[58] Field of Search ............... 235/379, 476, 380, 381; 194/DIG. 26, DIG. 4, DIG. 6, DIG. 9, 4 R; 271/4, 9; 232/44

[56] References Cited

U.S. PATENT DOCUMENTS 3,866,235 2/1975 Maynard et al. ........... 194/DIG. 26

3,973,237 8/1976 Sawaguchi et al. ................ 235/379

4,282,424 8/1981 Hirose ................................ 235/381

*Primary Examiner*—A. D. Pellinen

*Assistant Examiner*—Robert Lev

*Attorney, Agent, or Firm*—Sughrue, Mion, Zinn, Macpeak and Seas

[57] ABSTRACT

A dual-purpose automatic apparatus for dispensing and depositing valuable papers and other documents comprises a feed means (10) for dispensing documents from an internal store (11) to an outfeed opening (12) or to a storage chamber (13) intended for documents whose transportation or handling has deviated from a predetermined program. The feed means (10) is arranged to feed documents posted externally through the opening (12), from the opening (12) to a separate storage chamber (14), i.e. the opening (12) functions as an outfeed opening and also as an infeed opening. The function of the feed means (10) as an infeed means is dependent on the correct activation of an identifying means (15), located adjacent the outfeed/infeed opening (12).

6 Claims, 2 Drawing Figures

DUAL-PURPOSE AUTOMATIC APPARATUS FOR DISPENSING AND DEPOSITING VALUABLE PAPERS AND OTHER DOCUMENTS, SUCH AS BANKNOTES, CHEQUES, RECEIPTS, VOUCHERS ETC.

TECHNICAL FIELD

The present invention relates to a dual-purpose automatic apparatus for dispensing and depositing valuable papers and other documents, such as banknotes, cheques, receipts, vouchers etc. The apparatus is of a known kind and comprises a feed means for feeding documents from an internal store, such as a magazine, to a receipt opening, which is common to all stores, or to a storage chamber, which is also common to all stores and which is intended to receive documents whose transportation from said document store to the receipt opening, or the handling of which documents during said transport has deviated from a predetermined program for some reason or other.

BACKGROUND ART

Apparatus of this kind are known from, for example, the U.S. Pat. No. 4,066,253. This patent specification describes in detail how banknotes are conveyed from a plurality of sequentially coupled magazines to a receipt opening accessible to the customer.

It is also previously known to provide separate safedeposit boxes where customers, for example during those times when the bank is closed, can deposit from outside the bank money envelopes containing cheques, which are then automatically converted to a safe location in the bank or like establishment. These systems and associated apparatus, however, are quite separate from the aforementioned apparatus for dispensing valuable papers etc. and are constructed in a different manner from such apparatus.

It may occur in practice that one and the same customer desires at one and the same time to deposit cheques received during a business day, and to withdraw cash in amounts which vary from time to time. At present, these transactions must be carried out at different locations, which might be relatively far apart, which is a disadvantage and also perhaps a security risk. The object of the present invention is, among other things, to eliminate this disadvantage, by enabling the units incorporated in such a dispensing apparatus and depositing apparatus to be utilized more efficiently.

SUMMARY OF THE INVENTION

In accordance with the invention the feed means of an automatic dispensing apparatus of the aforementioned kind is arranged also to feed documents inserted into the receipt opening from outside said bank or like establishment, said receipt opening then also functioning as an infeed opening, from said opening to a storage chamber intended for documents which have been posted through said apparatus from outside the bank. The function of the feed means as an infeed means is dependent on the correct activation of an identifying means located adjacent the outfeed/infeed means.

These and other features of the invention are set forth in the following claims.

Figure 1:
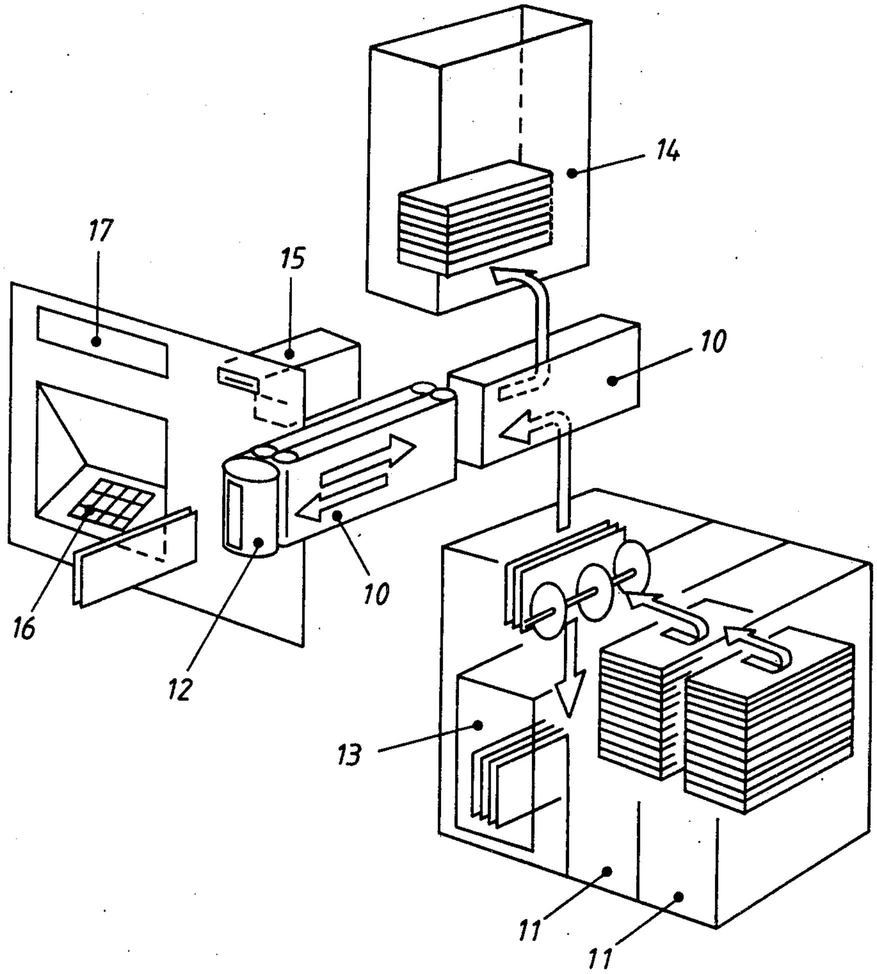
FIG. 1 illustrates the basic inventive concept.

The present invention will now be described in more detail with reference to the accompanying drawings, which illustrate schematically the preferred construction of a dual-purpose automatic apparatus according to the invention, for both depositing money into, and also withdrawing money from, said bank or like establishment for example.

PREFERRED EMBODIMENT OF THE INVENTION

The dual-purpose automatic apparatus illustrated in the drawing comprises a feed means 10 in the form of two mutually co-acting belts, and guide means for feeding, for example, banknotes from an internal store, in the form of magazines 11, to an outfeed or receipt opening 12 which is common to all stores, or to a storage space 13, which is also common to all stores 11 and which is intended to receive banknotes whose transportation from said store to the outfeed opening 12, or whose treatment during said transportation of said banknotes, has deviated from a predetermined program; said magazines and said feed means being described and illustrated in more detail in the aforementioned U.S. patent specification. A deviation from the aforementioned predetermined program may be the result, for example, of two notes being dispensed simultaneously or as a result of a transaction which has not been completed by the customer. The outfeed or receipt opening 12 is arranged in a panel let into the wall of a bank, such as to enable a customer to take banknotes ordered by him through a keyboard 16 arranged in said panel. The storage space or chamber 13, on the other hand, can only be reached from inside the bank, by authorized personnel. The aforementioned publications disclose examples of the mechanical design of the requisite conveying means.

The feed means 10 is also arranged to feed-in documents placed by a customer into the outfeed opening 12 from outside the bank, said outfeed opening then functioning as an infeed opening. As will be understood, when documents or banknotes are fed in through the opening 12, the direction of movement of the feed means (the belts) 10 is reversed, and the documents or banknotes are conveyed, with the aid of guide means, from the opening 12 to a storage space or chamber 14 intended to receive such documents. Thus, the aforementioned guide means, which may comprise electronically controlled rollers and/or belts and guide rails, have two functions, namely to guide an ordered number of banknotes toward the mutually co-acting belts of the feed means 10, and to guide documents posted from outside the bank from said co-acting belts to the storage space 14.

In order for the feed means 10 to function as an infeed means, it is necessary to activate correctly an identifying means 15 arranged in the panel adjacent the outfeed-/infeed opening 12. This identifying means may comprise a card reader so designed than when a customer inserts a bankers card in an opening provided therefor in the card reader, and also presses a "depositing button" on the keyboard 16 located in the panel, a cover plate is automatically moved away from the opening 12, so that the customer is able to place, for example, an envelope containing cheques into the opening, said envelope being immediately conveyed to the storage space 14 by the feed means 10.

Alternatively, the arrangement may be such that, subsequent to the customer proving his or her authority by inserting a banker's card into the card reader 15 and pressing the requisite button, and subsequent to the card reader transmitting an acceptance signal, the feed means 10 delivers a service envelope to the opening 12 from an "envelope magazine 11" or a separate magazine. In this case, when the customer removes the envelope from the opening 12 the direction of rotation of the belts of the feed means is reversed, e.g. by means of optical sensors arranged in the opening 12. The customer can then place those items which he wishes to deposit into the envelope and return the envelope to the opening 12. The envelope is then automatically conveyed to the storage space or chamber 14.

In order to prevent filled envelopes of excessive thickness from being fed through the opening 12, there is suitably arranged in the opening 12 a thickness-measuring means which, if the envelope exceeds a given thickness, sends a signal to the feed means 10 so as to reverse the direction of movement of the belts, so that the envelope is returned through the opening 12. Means may also be provided for illuminating an "error" signal on a screen 17 at the same as the envelope is returned.

Suitably, there is arranged in the path travelled by the envelope between the opening 12 and the storage chamber 14 a printing unit arranged to stamp on the envelope an identification code obtained from the card inserted into the card reader 15 or from the code inserted by the customer through the keyboard 16 and also the place where the envelope was deposited and the time at which the deposit was made. This printing unit can also be used for printing a receipt, showing the sum which an indentified customer has ordered for withdrawal. This receipt is issued through the opening 12 together with the banknotes ordered.

A dual-purpose automatic bank-transaction apparatus according to the invention also incorporates an electronic unit programmed to produce the requisite start, stop, identification, and possibly other signals, for example information signals, necessary for carrying out the various sequences of functions described in the aforegoing. In turn, the electronic unit is controlled by activation of different buttons on the keyboard 16, for example, a deposit button, a withdrawal button, a receipt button, thereby activating various parts of an inbuilt program, each comprising a series of functions in response to the wishes of the customers at that time. This technique is well known and will not therefore be described in detail here. The technique, however, is highly flexible and enables the requirements and wishes of different customers to be fulfilled. By way of example can be mentioned the case of a customer who desires to deposit documents and, at the same time, to withdraw money, and who wishes to receive two separate receipts for these transactions. The steps taken by the customer in this case will be as follows: The customer presents his or her bankers card—presses a deposit button—presses a receipt button—presses a withdrawal button—presses buttons corresponding to the amount to be withdrawn—presses a receipt button. If the customer requires only a single receipt for the two transactions, he should only press the receipt button once, namely as the last step in the transaction sequence. While the transactions are taking place, the screen or sign 17 presents to the customer information or instructions which are logically connected to the wishes of the customer and to the programmed functions of the apparatus.

Figure 2:
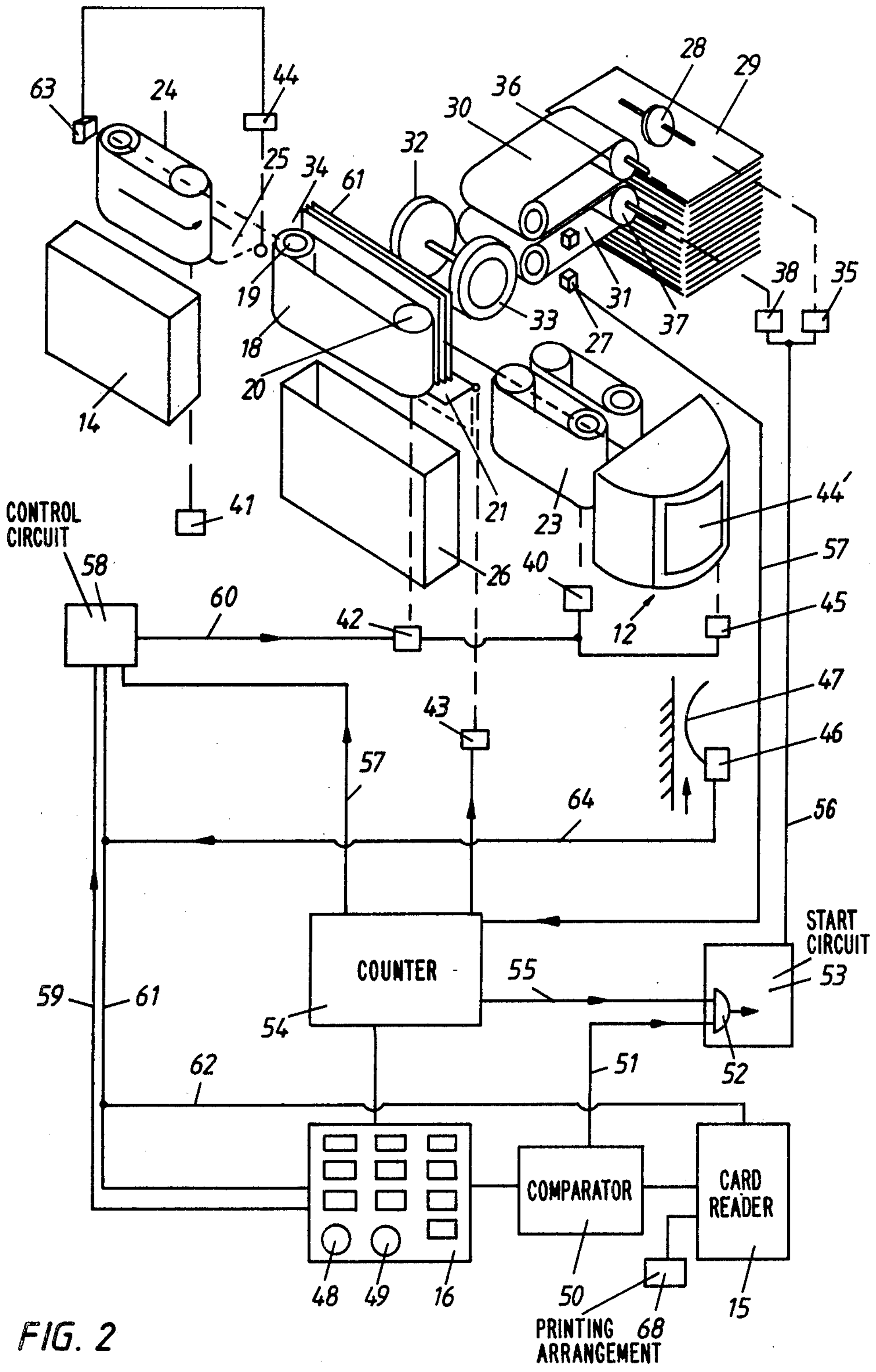
FIG. 2 illustrates the apparatus of FIG. 1 in more detail and includes an outline of the control scheme.

FIG. 2 illustrates the apparatus shown in FIG. 1 in more detail. The feed means 10 of the FIG. 1 embodiment corresponds in FIG. 2 to the endless belt 18, which is arranged on two rollers 19 and 20 having substantially vertical shafts. The belt 18 is arranged to co-act with a plate 21 pivotally arranged on a horizontal shaft 22. The feed means 10 of the FIG. 1 embodiment also incorporates a conveyor 23 and a conveyor 24. The conveyor 23 comprises two endless belts mounted on rollers, these belts carrying therebetween a bundle of banknotes to be fed-in or the envelope or the like to be deposited. The conveyor 24 is of the same kind as the conveyor 18 and is arranged to co-act with a pivotable plate 25. The conveyor 18 is arranged to receive deposits and transfer said deposits to the storage chamber 14. In the illustrated embodiment there are also provided a cancellation container 26, for receiving banknotes which are not to be fed to the customer owing to an error in calculation or a like fault, and sensing means 27, for example optoelectrical means, for counting the number of banknotes dispensed and for checking the eventuality of two banknotes being dispensed at the same time. These means are of a kind well known in the art.

For the purpose of feeding banknotes from at least one magazine 11 there is used, for example, a feed means of the kind described in U.S. Pat. No. 4,066,253, as indicated in FIG. 1, by means of which banknotes, envelopes etc. can be dispensed from different magazines. FIG. 2 illustrates in a simplified fashion a feed means which comprises a feed roller 28, arranged to advance one banknote from a bundle of banknotes 29 each time the roller rotates, it being assumed that the banknotes 29 are located in a magazine 11. Each banknote dispensed is passed into a conveyor comprising two endless belts 30 and 31, and from there over two rollers 32 and 33 mounted on a common shaft, these rollers being arranged to rotate clockwise to feed banknotes one after the other to a collector 34, which comprises the endless belt 18. The feed roller 28 is driven by a motor, and two drive rollers 36 and 37 are driven from a motor 38. Sensing means 27 are provided for counting and sensing advanced banknotes.

The conveyor 23 of the illustrated embodiment comprises two mutually co-acting endless belts which extend over rollers having vertical shafts, said conveyor being driven by a reversible motor 40. The transporter 24 is driven by a motor 41 in the direction shown by the arrow on the conveyor belt, and the belt 18 is driven by means of a reversible motor 42. The two plates 21 and 25 are arranged to be swung from a horizontal position to a vertical position by means of a respective electromagnetic device or motor 43 and 44. As before mentioned, the outfeed opening is suitably provided with a cover, identified in FIG. 2 by reference 44', said cover being arranged to be moved to one side by an electromagnetic operating means 45 to expose the opening 12. Conveniently, there is arranged in the housing incorporating the opening 12 a thickness-measuring device, which in the embodiment illustrated in FIG. 2 comprises a microswitch 46 provided with an operating arm 47 arranged to be moved to one side by a bundle of dispensed banknotes or by an envelope or the like to be deposited in the collecting container 14. As will be understood, the thickness-measuring device has no function to fulfil when banknotes are dispensed. When posting documents or the like, however, whose thickness is such as to cause the arm 47 to move to the right in FIG. 2 to an extent such as to close the microswitch 46, a reversing signal is transmitted as hereinafter described.

The keyboard 16 of the illustrated embodiment is provided with a deposit key 48, which shall be pressed by a customer wishing to deposit banknotes or the like, and a withdrawal button 49, which shall be pressed by the customer when wishing to withdraw a sum inserted on the keyboard 16.

It is assumed in the following that the withdrawal of a given sum shall take place first. Thus, the customer presses a withdrawal key 49, inserts his or her bankers card into the card reader 15 and enters his or her personal number code on the keyboard. The code is sent from the keyboard 16 and from the card reader 15 to a comparator 50. When the two codes received by the comparator agree with one another, the comparator 50 sends an all-clear signal over a line 51 to one input of a gating circuit 52, which forms part of a start circuit 53 for commencing a banknote dispensing operation. The all-clear signal is suitably also sent to the keyboard 16, which in this case is provided, for example, with a light diode (not shown) which illuminates and indicates to the customer that the sum he or she wishes to withdraw can be entered on the keyboard.

The keyboard 16 is coupled to a counter circuit 54, in which the sum to be withdrawn entered on the keyboard is registered. As soon as the sum to be withdrawn has been registered in the counter 54, a signal is sent over line 55 to the gating circuit 52, whereupon the gate opens and activates the start circuit 53. The start circuit 53 sends an activating signal over line 56 to the two motors 35 and 38, therewith causing one banknote at a time to be fed to the collector 34. Each banknote which passes the sensor 27 causes the sensor to send a counter signal over a line 57 to the counter 54 which decreases its content to a corresponding extent. When the content of the counter 54 has been decreased to zero, the gate 52 closes and the motors 35 and 38 are stopped. If there should be an error during this banknote-dispensing operation, for example, should two banknotes which are stuck together be dispensed simultaneously, this is indicated by the sensor 27 and the counter signal forms an error signal which is sent to the counter 54, which sends a start signal to the means 43, causing the plate 21 to be swung downwardly and the dispensed banknotes resting thereon to fall into the collecting container 26. When the counter 54 has been counted down to zero, a signal is sent over line 57 to a control circuit 58. This control circuit 58 has received through line 59 the signal produced when pressing the withdrawal button 49 and has been activated in a manner such that the drive motors 40,42 operate with a rotational direction for dispensing banknotes. When the control circuit 58 receives the signal from the counter 54, an activating signal is sent over line 60 to the motors 40 and 42, and the sum to be withdrawn is dispensed through the opening 12 with the banknotes standing on their long edges. As before mentioned, the cover 44′ is moved to one side by means of the operating means 45, which is activated by the signal on line 60.

When wishing to deposit banknotes or valuable documents, the customer presses the deposit button 48, whereupon a signal is sent over line 61 to the control circuit 58, which re-sets the reversible motors 40 and 42 to operate in a direction opposite to that when dispensing banknotes. It is also assumed in this case that a bankers card is necessary and that the customer is required to insert the card into the card reader 15, which sends an acceptance signal to the control circuit 58, over a line 62. This signal forms an activating signal on line 60, and the motors 40 and 42 are started and the operating means 45 caused to move the cover 44′, so as to expose the combined infeed and outfeed opening 12. The motors 40 and 42 will now drive the belts 18 and 23 in a manner to feed the documents into the apparatus towards the conveyor 24 which in the illustrated embodiment is assumed to be continuously driven by the motor 41. When the deposited documents are fed onto the plate 25, they ultimately reach a sensing means or microswitch 63, which when activated closes a circuit for the operating means 44, which then causes the plate 25 to drop. The documents posted through the infeed opening by the customer are thus transferred to the storage chamber 14. The plate 25 is then returned to its horizontal position by means not shown, for example a spring, whereupon the transaction is completed.

When posting the document through the opening 12, they are forced to pass the aformentioned thickness-measuring device 46,47. If the thickness of the posted documents, which, for example, may be held in an envelope exceeds a given value and thus preventing the documents from being fed through the conveyor 23, the microswitch 46 will close and a signal is sent over line 64 to the control circuit 58, which is then re-set to a dispensing mode, i.e. the motors 40 and 42 are reversed and the documents fed back through the opening 12.

As mentioned in the introduction it is possible to provide a customer wishing to deposit banknotes or the like with an envelope. In this case, the motors 35 and 38 must first be activated in a manner similar to that when dispensing banknotes, that being selecting a magazine 11 containing envelopes, and the sequence of operation is started by using the deposit key. As soon as an envelope has been dispensed, the system switches to the described sequence of operations for depositing documents. In this case, a signal is sent first via the deposit button 48, through a circuit (not shown) to the line from the deposit key, and when a given length of time has lapsed, the system switches to the described depositing mode.

If desired, a printing arrangement 68 can be provided in the opening 12 or in front of said opening, said printing arrangement being intended to print onto posted documents a customer's identification code, which is transferred from the card reader 15, and the time and place at which the deposit was made.

I claim:

1. A dual-purpose automatic apparatus for dispensing and depositing, valuable papers and other documents, such as banknotes, cheques, receipts, vouchers etc, comprising a feed means (10) for dispensing documents from an internal store (magazines 11) to an outfeed opening (12), or to a storage space (13) which is intended to receive documents whose transportation from said store to said outfeed opening (12), or whose treatment during said transportation, has deviated from a predetermined program for some reason, characterized in that the feed means 10 is arranged also to feed documents posted through the outfeed opening (12), which thus also functions as an infeed opening, from said opening (12) to a storage chamber (14) intended to receive documents posted from without; and in that the function of the feed means (10) as an infeed means is dependent upon correct activation of an identifying means (15) arranged adjacent the outfeed/infeed means (10).

2. An apparatus according to claim 1, characterized in that the storage space (13) and the storage space (14) for receiving documents posted from without are physically separated.

3. An apparatus according to claim 1, characterized in that co-acting with said opening (12) is a thickness-measuring device, which is arranged to reverse the functioning direction of the feed means (10) when documents posted through the opening (12) from without have a thickness which exceeds a pre-determined value.

4. An apparatus according to claim 1, characterized in that said internal store comprises a plurality of magazines (11) and in that the feed means (10) is arranged to dispense an envelope from one of said magazines to said opening (12) upon receipt of an acceptance signal via the identifying means (15) and upon receipt of an infeed activating signal, said envelope being intended for documents which are posted by the customer and which are to fed to the storage chamber (14) intended for externally posted documents, said opening (12) and said storage space (13) each being in communication with all of said magazines.

5. A dual-purpose automatic apparatus for both dispensing documents of a first type and also depositing in the apparatus documents of a second type inserted from outside the apparatus, comprising:

first storage means in the apparatus for storing documents of the first type;

second storage means in the apparatus for storing documents of the second type;

only a single opening in the apparatus for dispensing documents of the first type and for receiving documents of the second type;

reversible feed means, communicating with said single opening and with both said first and said second storage means, for selectively (1) feeding documents of the first type in a first direction from said first storage means to said single opening and (2) feeding documents of the second type in the opposite direction from said second storage means to said single opening; and control means for controlling said reversible feed means selectively to operate in said first and said opposite directions.

6. An apparatus according to claim 5 wherein said documents of said first type comprise money, and wherein said control means comprises manually operated means for specifying the amount of money to be dispensed through said single opening.

* * * * *